US011923618B2

(12) United States Patent
Houser et al.

(10) Patent No.: US 11,923,618 B2
(45) Date of Patent: Mar. 5, 2024

(54) DIGITAL CONFORMAL ANTENNA

(71) Applicant: Northrop Grumman Systems Corporation, Falls Church, VA (US)

(72) Inventors: Peter B. Houser, Poway, CA (US); Yianni Tzanidis, Springboro, OH (US); Scott R. Burnside, Rescue, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 535 days.

(21) Appl. No.: 17/118,994

(22) Filed: Dec. 11, 2020

(65) Prior Publication Data

US 2022/0190474 A1 Jun. 16, 2022

(51) Int. Cl.
*H01Q 3/38* (2006.01)
*H01Q 1/42* (2006.01)
*H01Q 1/48* (2006.01)
*H01Q 5/307* (2015.01)

(52) U.S. Cl.
CPC ................. *H01Q 3/38* (2013.01); *H01Q 1/42* (2013.01); *H01Q 1/48* (2013.01); *H01Q 5/307* (2015.01)

(58) Field of Classification Search
CPC ............ H01Q 3/38; H01Q 5/307; H01Q 1/42; H01Q 1/48
USPC .......................................................... 342/372
See application file for complete search history.

(56) References Cited

U.S. PATENT DOCUMENTS

| | | | | |
|---|---|---|---|---|
| 5,130,717 | A | 7/1992 | Ewen | |
| 5,347,287 | A | 9/1994 | Speciale | |
| 7,417,598 | B2 | 8/2008 | Navarro | |
| 9,716,322 | B2 | 7/2017 | Holzheimer | |
| 9,832,545 | B2 | 11/2017 | Houser | |
| 10,103,795 | B2 | 10/2018 | Houser | |
| 10,116,051 | B2 | 10/2018 | Scarborough | |
| 10,181,866 | B2 | 1/2019 | Gharavi | |
| 10,461,421 | B1 | 10/2019 | Tran | |
| 10,523,331 | B2 | 12/2019 | Calhoun | |
| 10,554,213 | B2 | 2/2020 | Houser | |
| 11,552,405 | B1 * | 1/2023 | Bily | H01Q 21/061 |
| 11,609,324 | B2 * | 3/2023 | Devaraj | H01Q 9/0435 |
| 2002/0111149 | A1 | 8/2002 | Shoki | |
| 2009/0280866 | A1 | 11/2009 | Lo | |

FOREIGN PATENT DOCUMENTS

| | | | |
|---|---|---|---|
| EP | 3319172 | A1 | 5/2018 |

* cited by examiner

*Primary Examiner* — Harry K Liu
(74) *Attorney, Agent, or Firm* — Dority & Manning, P.A.

(57) ABSTRACT

A phased-array antenna system includes: an array of discrete antenna modules disposed conformally with an exterior surface of a platform; a digital distribution system comprising a digital communications medium to convey digital signals to and/or from respective input/output ports of the antenna modules; and a controller system to supply and/or receive the digital signals to/from the antenna modules via the digital distribution system. The controller system controls relative phases of the digital signals to enable the antenna elements to form a directive antenna beam pattern. Each antenna module includes: an antenna element to emit and/or absorb RF signals; an input/output port to send and/or receive digital signals; an electronics unit including an A/D and/or D/A converter to provide an interface between the antenna element and the input/output port; and a housing in which the antenna element and electronics unit are packaged.

19 Claims, 7 Drawing Sheets

DIGITAL CONFORMAL ANTENNA

TECHNICAL FIELD

Described herein are example implementations of a digital conformal antenna and phased-array antenna systems that employ digital conformal antennas.

BACKGROUND

Phased-array antenna systems capable of forming steerable and fixed beam patterns to emit or absorb radio frequency (RF) energy in specific directions are of increasing importance in a wide range of commercial and military applications. For example, 5G cellular communication standards anticipate the use of multiple-input, multiple output (MIMO) spatial multiplexing in which base station antennas transmit multiple data streams with respective directional beams using the same time and frequency resources.

The size and shape of an antenna array depends on several factors, including the number of antenna elements in the array, the operating frequencies, the spacing of the antenna elements, and the desired shape and characteristics of the antenna beam pattern to be formed. Arrays that are bulky and obtrusive may be unsuitable for certain types of platforms and applications. The overall size of a phased-array antenna system depends on the antenna array itself as well as the supporting hardware, including transmitter and receiver electronics and the beamforming and RF signal distribution system. For example, analog signal distribution systems involving RF cables and manifolds can be heavy and inflexible and may introduce signal losses that are undesirably large at longer cable lengths. Development of phased-array antenna systems whose antenna elements can be integrated inconspicuously into a variety of platforms and whose overall footprint can be minimized will facilitate wider adoption of such systems in a range of applications, including cellular communications.

SUMMARY

Described herein are examples of antenna modules and corresponding phased-array antenna system comprising a plurality of such antenna modules arranged in an array and disposed conformally across a surface of a platform. According to example implementations, each antenna module includes: an antenna element to emit and/or absorb radio frequency (RF) signals; an input/output port to send and/or receive digital signals; an electronics unit including at least one of an analog-to-digital (A/D) converter and a digital-to-analog (D/A) converter to provide a digital interface between the antenna element and the input/output port; and a housing in which the antenna element and electronics unit are integrally packaged. The phase-array antenna system further comprises a digital distribution system including a digital communications medium to convey digital signals to and/or from respective input/output ports of the antenna modules, and a controller system to supply the digital signals to the antenna modules and/or to receive digital signals from the antenna modules via the digital distribution system, wherein the controller system controls relative phases of the digital signals to enable the antenna elements to form a directive antenna beam pattern.

The above and still further features and advantages of the described system will become apparent upon consideration of the following definitions, descriptions and descriptive figures of specific embodiments thereof wherein like reference numerals in the various figures are utilized to designate like components. While these descriptions go into specific details, it should be understood that variations may and do exist and would be apparent to those skilled in the art based on the descriptions herein.

DETAILED DESCRIPTION

Figure 1A:
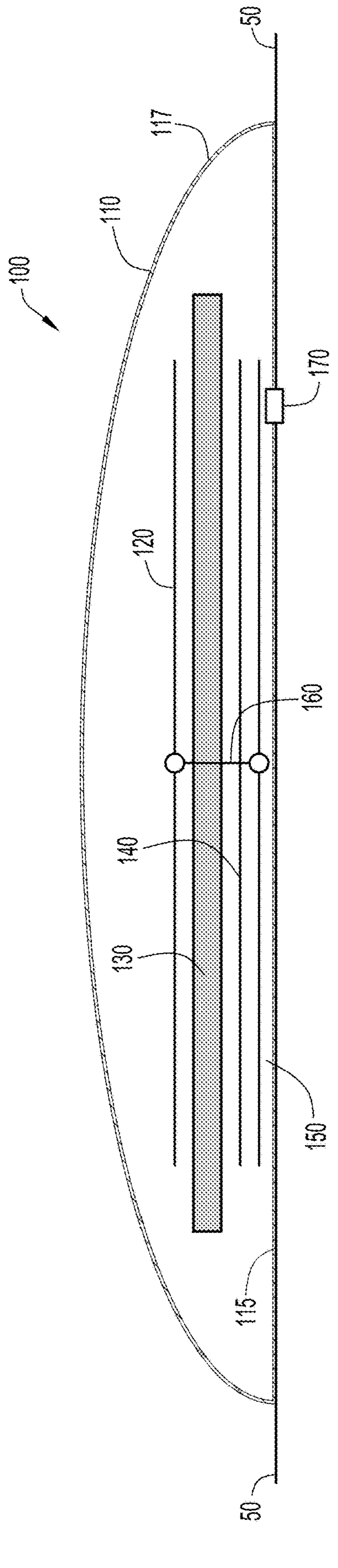
FIG. 1A is schematic cross-sectional side view of an example conformal antenna module arranged on and slightly protruding from an exterior surface of a platform.

Distributed directional aperture (DDA) antenna systems provide an innovative approach to directional beamforming by distributing an array of antenna elements across the surface of a platform and by employing phased-array beamforming to transmit and receive signals via directional beams. Depending on the application, the antenna elements can be emitters that emit RF energy into the environment, sensors that absorb RF energy from the environment, or both. Included in the many potential applications for such antenna systems are cooperative communications (e.g., cellular communications), uncooperative signal intercept, uncooperative signal interference (e.g., jamming), and distance and/or range rate sensing (e.g., radar). A wide variety of antenna system platforms may be suitable for installation based on the particular application, including: airborne vehicles (e.g., airplanes, airships, helicopters, or drones), space vehicles (e.g., satellite or deep space probes), ground vehicles, maritime vehicles, fixed ground structures (e.g., buildings or towers), and maritime structures.

The antenna array of a DDA antenna system can include any number of antenna elements positioned in any of a variety arrangements that provide a desired beam pattern. By way of a non-limiting example, the array may include between 20 and 100 antenna elements and in some applications many more. The antenna elements of the DDA antenna system described herein are packaged in respective antenna modules that are “discrete” or independent from each other in the sense that the antenna modules are individually mounted on the platform and physically separated from each other across the surface of the platform. As is well known, the spacing between adjacent antenna elements is dictated to a certain extent by the operating wavelength and desired beam pattern characteristics (e.g., beam width, sidelobes, nulls, etc.). Typically, the spacing between adjacent antenna elements in the array is on the order of λ/2, where λ is the free-space operating wavelength, and the overall array dimensions is commonly between 10λ and 100λ in each dimension.

In many applications, it would be advantageous for the antenna modules of the antenna system to be as conformal to the shape of the surface of the platform as possible. For example, conventional cellular base station installations are obtrusive and unsightly, which can restrict the locations suitable for deployment. Wider adoption of the 5G cellular standard will require installation of many more base stations, and conformal antenna modules allow for inconspicuous installation on a variety of existing structures, such as buildings or on less obtrusive towers. In an airborne context, conformal antenna modules of a DDA antenna system can be arranged in an array over a surface of an aircraft, such as a wing, without significantly impacting the aerodynamics of the surface. The example antenna modules described herein enable such implementations.

It would also be advantageous for the antenna modules of a DDA antenna system to be coupled to a beamforming system via a digital interface. The example antenna modules described herein can incorporate circuitry enabling and providing a digital interface to the antenna to support a fully digital signal distribution system from a back-end beamforming system all the way to the individual antenna modules, potentially using an interface standard such as VITA 49.2 or VICTORY. This approach avoids the structural, weight, and signal loss disadvantages associated with distributing analog signals to the antenna modules. Utilizing a DDA antenna system whose antenna modules have a digital interface significantly reduces the cost and weight of the overall mission equipment package. The digital interfaces can utilize a digital medium such fiber optic or lightweight copper connections for digital RF signals and replaces an extensive network of heavy and bulky coaxial analog RF cables or the like. In certain applications requiring an omnidirectional antenna, an individual antenna module with a digital interface as described herein may be useful, though the antenna gain would likely be less than that obtained with a directional array of such antenna modules.

According to another aspect of described system, the antenna module may include a multi-band antenna element capable of operating at two or more bands, e.g., within the frequency region of 0.2 GHz to 3.0 GHz. A DDA system typically benefits from a wide region of data acquisition so that many waveforms can be serviced. However, such a wide bandwidth drives undesirable antenna physical constraints, e.g., the antenna must be thicker in order to accommodate a greater ground plane or a larger separation between the antenna element and the ground plane. Such requirements run contrary to the desire to make the antenna modules as conformal to the platform surface as possible. However, in certain applications, such as cellular communications, the waveforms of interest typically lie within specific, narrower bands within the wider region. For example, many cellular waveforms are in the bands of 0.6-0.8 GHz and 2.5-2.8 GHz. The described antenna module is capable of capturing those bands across a wide angular extent with reduced impact on the physical dimensions.

As used herein and in the claims, the terms "conformal" and "conformally" mean that the shape and placement of the antenna module(s) relative to the surrounding contour or profile of the exterior skin or surface of the platform result in either no perturbation or distortion in the native contour of the platform's exterior surface or only a slight perturbation of or protrusion from the native contour of the platform's exterior surface (e.g., a "bump" in the surface profile). In one example of a conformal arrangement, the antenna modules are affixed to the exterior surface of the platform such that the antenna modules protrude from the exterior surface. In this case, to be conformal with the exterior surface of the platform, the rear surface of each antenna module is shaped to be congruent with (follow the contour of) the exterior surface of the platform, and the outward-facing surface of each antenna module has a smooth, continuous curvature substantially free of any seams, steps, or discontinuities, such that the resulting "bump" sufficiently blends into the profile of the platform. This type of arrangement may be advantageous or desirable in situations where minimal or no significant modifications can be made to the surface of a pre-existing platform and requires relative thin antenna modules.

In another example of a conformal arrangement, the antenna module(s) may be at least partially recessed relative to the exterior surface of the platform such that only a portion of each antenna module protrudes from the profile of the exterior surface of the platform. Such an arrangement relaxes the requirement for the antenna modules to be particularly thin but may require greater modification where an existing platform is retrofitted with antenna modules.

Where the shape and placement of an antenna module result in a protrusion from the contour of the exterior surface of the platform, a conformal arrangement is commonly constructed such that, in addition to the protrusion having a smooth curvature without steps or discontinuities in its profile, that the maximum distance of the protrusion normal to the contour of the exterior surface of the platform is less than 35% of a smallest dimension of the protrusion lying along the exterior surface of the platform. For example, a conformal circular protrusion having a diameter of 10 cm would extend to a height of less than 3.5 cm from the exterior surface of the platform. Optionally, a conformal protrusion may have a maximum height normal to the contour of the exterior surface of the platform that is less than 20% of the smallest dimension of the protrusion lying along the exterior surface of the platform. Optionally, a conformal protrusion may have a maximum height normal to the contour of the exterior surface of the platform that is less than 10% of the smallest dimension of the protrusion lying along the exterior surface of the platform.

In another example of a conformal arrangement, the outward-facing portion of each antenna module housing can be shaped and positioned to be flush with or follow the contour of the exterior surface of the platform such that the antenna modules do not protrude from or distort the contour of the exterior surface. In this case, each antenna module is fully recessed such that the upper surface of its housing is aligned with the profile of the surrounding exterior surface. For example, where the exterior surface of the platform is planar, the surface of the outward-facing portion of the antenna module housing lies in the plane of the exterior surface of the platform.

In another example of a conformal arrangement, where the exterior surface of the platform is constructed of a material that permits passage of electromagnetic energy at the operating wavelength of the antenna modules, the conformal antenna modules can be located behind and adjacent to the exterior surface of the platform, resulting in no protrusion or distortion of the profile of the exterior surface of the platform. According to one option, in this case, local portions of the exterior surface of the platform can serve as the outward-facing surfaces of the antenna module housings.

FIG. 1A is a cross-sectional side view in elevation of an example implementation of an antenna module 100 arranged conformally with an exterior surface 50 of a DDA platform. Antenna module 100 has a generally "pancake" or disk-like shape with a circular footprint (i.e., along its back surface), as seen in the top plan view of antenna module 100 in FIG. 1D showing its "footprint" from above. In the conformal arrangement shown in FIG. 1A, antenna module 100 is affixed to the external surface 50 of a platform and protrudes therefrom, forming a slight "bump" that nevertheless substantially blends inconspicuously with the overall profile of the exterior surface of the platform.

Figure 1B:
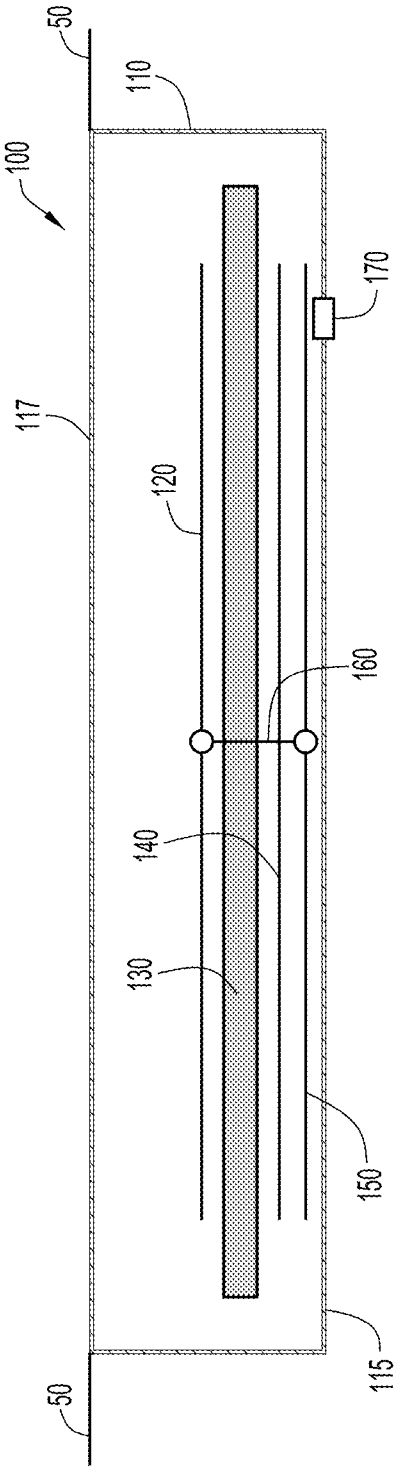
FIG. 1B is a schematic cross-sectional side view of another example conformal antenna module with a housing having an outward-facing surface that is substantially flush with an exterior surface of a platform.

FIG. 1B is a cross-sectional side view in elevation of another example implementation of antenna module 100 arranged conformally with an exterior surface 50 of the platform. In this case, antenna module 100 is recessed within an opening of surface 50, and the upper, outward-facing surface 117 of outer housing 110 of antenna module 100 is planar and lies flush (i.e., in the same plane) with exterior surface 50, such that there is no protrusion.

Figure 1C:
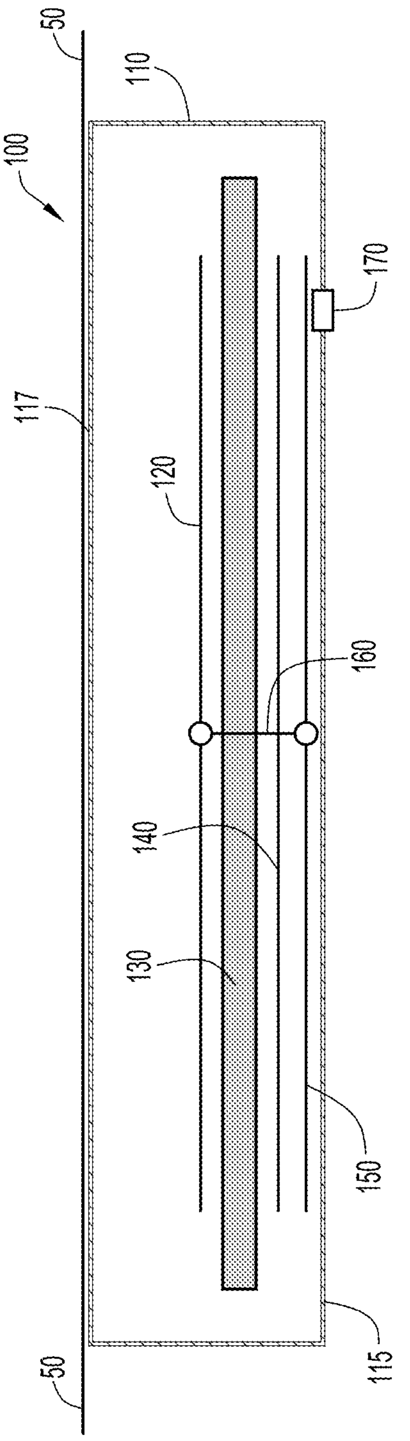
FIG. 1C is a schematic cross-sectional side view of another example conformal antenna module with a housing having an outward-facing surface that is arranged behind and substantially adjacent to an exterior surface of a platform.
Figure 1D:
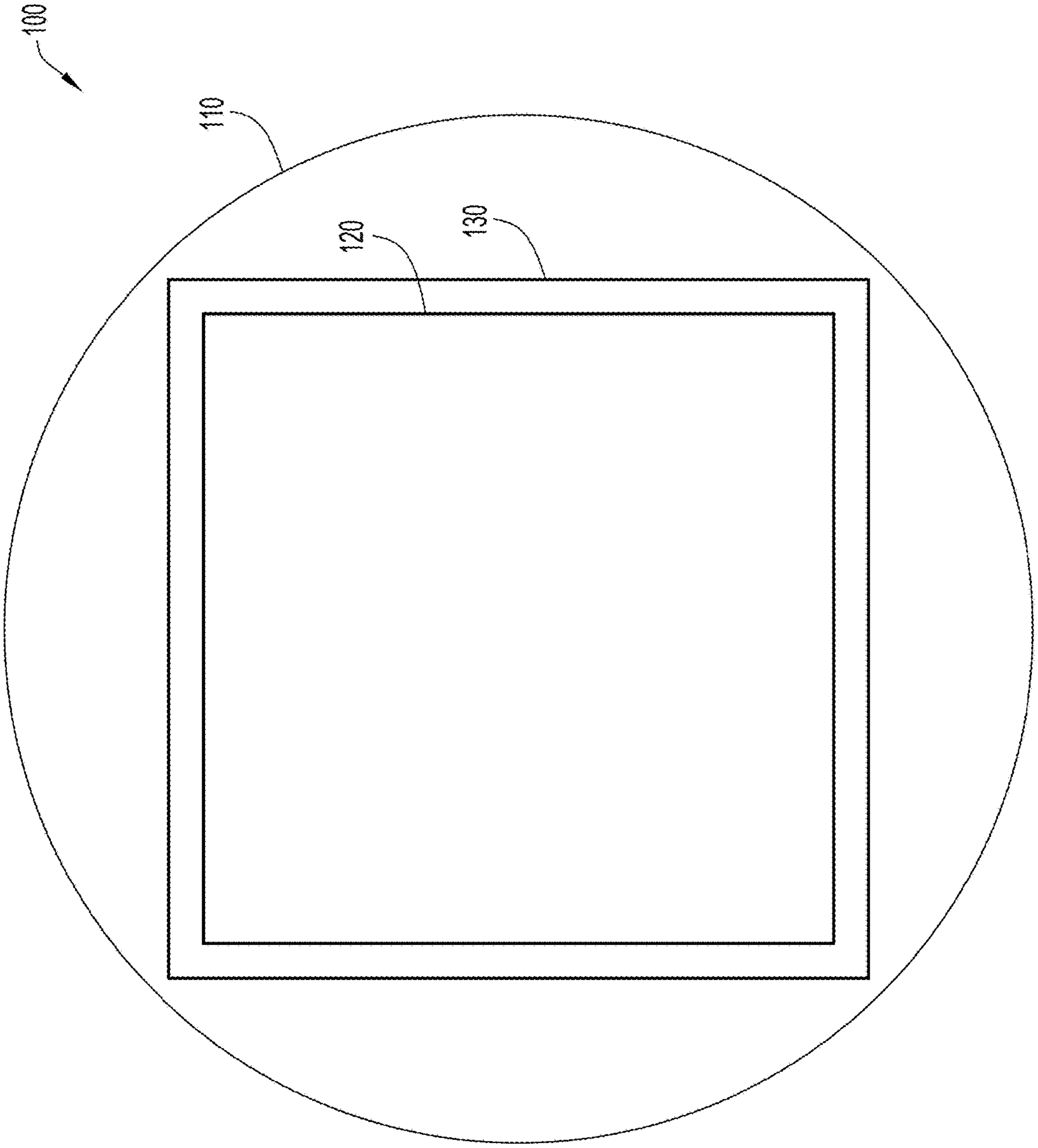
FIG. 1D is a top plan view of the example conformal antenna module shown in each of FIGS. 1A-1C.

FIG. 1C is a cross-sectional side view in elevation of yet another example implementation of antenna module 100 arranged conformally with an exterior surface 50 of the platform. In this case, the platform exterior surface 50 is transmissive to electromagnetic waves at the operating frequency, allowing antenna module 100 to be positioned behind and adjacent to exterior surface 50. According to one option, outward-facing surface 117 of module housing 110 can be affixed to an interior side of surface 50 or aligned in close proximity to surface 50 such that the outward-facing surface 117 substantially conforms to the shape of the adjacent surface 50.

As commonly shown in FIG. 1D, the example configurations of antenna module 100 shown in FIGS. 1B and 1C have substantially the same plan-view footprint as the example configuration in FIG. 1A. While the circularly shaped footprint of antenna module 100 shown in FIG. 1D may be convenient in some applications, it will be appreciated that this shape is just one non-limiting example and is not essential or critical to the overall concept. For example, antenna module 100 could have an oval, stadium, or elliptically shaped footprint, a polygonally shaped footprint (e.g., square, hexagonal, etc.), a rounded rectangle, a squircle, or an irregularly shaped footprint.

Conformal antenna module 100 includes a number of operational components arranged as stacked layers that are integrally packaged within an outermost housing 110. As used herein and in the claims, the term "integrally packaged" means completely enclosed by or contained within the outer housing. The topmost layer of the component stack within housing 110 is an antenna element 120, which is situated above a substrate 130. A ground plane 140 is disposed below substrate 130, and an electronics unit 150 is disposed below the ground plane 140 in the vicinity of the back surface 115 of housing 110. An RF distribution element 160 couples electronics unit 150 to antenna element 120.

A digital input/output port 170 disposed along the back surface or along an edge of antenna module 100 is coupled internally to electronics unit 150 to send and/or receive digital signals to/from an external digital communications medium of a digital distribution system, described below, and provides a point of ingress into and/or egress out of housing 110 of antenna module 100 for digital signals. Digital input/output port 170 is structured to mate with the terminal end of the external digital communications medium, e.g., a jack, socket, terminal, receptacle or other female connector(s) designed to receive a corresponding plug or male connector(s) of a wire or cable. For example, digital input/output port 170 can be an optical fiber port to facilitate a removable or fixed coupling of an optical fiber of the digital distribution system. It will be appreciated that digital input/output port 170 is not limited to any particular connector or terminal format or digital standard, provided it is compatible with the corresponding digital communication medium.

Outermost housing 110 of antenna module 100 comprises a superstrate 117 such as a radome that permits RF energy to pass between antenna element 120 and the surrounding environment and provides the overall outward-facing shape of antenna module 100, such as the "pancake" shape shown in FIG. 1A or the planar shapes shown in FIGS. 1B and 1C. In the example in FIG. 1A, the back surface 115 of housing 110 is shaped as a substantially circular, planar disk that joins superstrate 117 at its circumference to provide the fully enclosed outer housing 110. In the examples shown in FIGS. 1B and 1C, the superstrate 117 and back surface are connected via a ring-shaped sidewall of housing 110 to provide the fully enclosed housing.

Optionally, antenna module 100 can have a "low-profile," meaning that the antenna module has a maximum height dimension, normal to the back surface (i.e., its thickness), that is less than approximately $1/10^{th}$ of the free-space operating wavelength ($\lambda/10$) and, optionally, less than approximately $\lambda/20$. Within antenna module 100, the spacing between antenna element 120 and ground plane 140 may be on the order of $\lambda/100$ to help enable the overall low-profile thickness of antenna module 100. Because of their relative thinness, such low-profile antenna modules may be particularly beneficial in achieving a conformal arrangement where the antenna module is arranged on top of the outer surface of the platform such that the entire thickness protrudes from the contour of the exterior surface of the platform, i.e., the arrangement shown in FIG. 1A. Such a configuration is especially suitable where, due to system design constraints, minimal or no modification of the underlying platform structure is feasible or desirable. Where the antenna modules can be accommodated in recesses in the exterior surface of the platform or arranged behind the exterior surface of the platform, the need for a low-profile housing may still be beneficial but may be less critical in achieving a conformal arrangement of the array relative to the native contour of the profile of the outer surface of the platform.

According to some non-limiting examples, superstrate 117 can feature planar, convex-shaped, or flexible laminates using epoxy or Teflon-based laminates or the like, blank layers, layers with etched metallic (e.g., copper), foam (e.g., low dielectric constant material dk2), or a magnetic material having a magnetic permeability constant (e.g., mur>1).

In the arrangement shown in FIG. 1A, conformal antenna module 100 can be attached to an exterior surface or skin of a platform along its back surface 115 using various methods including adhesives, fasteners, and appropriately rated tape (e.g., VBH™ double-sided tape). For example, housing 110 may include mounting features such as screw hole patterns, gaskets, or adhesive materials so that it can be incorporated on a larger platform structure such as a building, a tower, a terrestrial vehicle, a ship, or an aircraft as previously described. These mounting structure features enable a conformal antenna module to be disposed in isolation or in close proximity to other conformal antenna modules to form a digital conformal antenna array.

The mounting arrangement and RF characteristics of an array of conformal antenna modules can be selected to provide desired operational parameters of the DDA antenna system, including center frequency, bandwidth, directivity, and gain. These design features can be adjusted to optimize characteristics at multiple bands within an overall frequency region. Such tuning can result in desirable physical characteristics, e.g., an overall thinner design.

In the implementation shown in FIGS. 1A-1D, antenna element 120 is a substantially rectangular (e.g., square), planar conductor that is shaped and sized to emit and/or absorb RF energy in at least one frequency band, and optionally in two or more frequency bands subject to tuning provided by RF distribution system 160 and electronics unit 150. It will be appreciated that any of a variety of other antenna element designs may be suitable for antenna element 120 provided such designs enable packaging within the outermost housing 110, and specific antenna shapes that reduce the need for separation between the ground plane 140 and the antenna element 120 are particularly suitable. For example, antenna element 120 can have an overall shape that is round, oval, stadium shaped, elliptical, polygonal, rounded rectangle shaped, squircle shaped, or bowtie shaped.

By tuning the designs of specific antenna module components, the antenna element can be optimized for performance at two or more relatively narrow bands within an overall wider region in a relatively thin antenna module. Examples of the specific methods for multi-band tuning include using snap-on connectors and adapters to feed the antenna terminals to provide a balanced and detachable antenna feed using commercial off-the-shelf (COTS) parts. The balanced feature is important to ensure low cross polarization radiation typically associated with unbalanced electrical currents on the antenna feed structure. The balanced featured also helps prevent "common mode" excitation and resonances typically associated with unbalanced currents on feed lines and cause scan blindness, a condition where the array does not radiate at certain angles. The detachable feature may be desirable for replacement/repair capability and also for controlling the height (or thickness) between the surface of antenna element 120 and the surface of ground plane 140. The height is important in the sense that a shorter adapter can be used to reduce the array thickness for lower operational bandwidth applications without modifying antenna element 120 itself.

Typical planar antennas have achieved wide spectrum coverage by physically separating the antenna from the ground plane by a spacing that is typically on the order of $\lambda/10$, where $\lambda$ is the free-space operating wavelength of the antenna element. A much thinner, conformal antenna module can be achieved by reducing this separation between the antenna element 120 and ground plane 140 to approximately $\lambda/200$. Example of techniques for achieving such a reduced separation include specific designs of substrate 130 that serves as a separator between antenna element 120 and ground plane 140. For example, substrate 130 can comprise a lossy ferrite material layered between antenna element 120 and ground plane 140. According to another option, substrate 130 can comprise a tunable resonant disk layered between antenna element 120 and ground plane 140 to improve return loss. Other techniques for reducing the separation between antenna element 120 and ground plane 130 include employing an embedded balanced/unbalanced transformation structure and employing a taper shape of antenna element 120 itself. Absent such techniques for enabling a thinner antenna module 100, more generally, the material thickness of substrate 130 can be on the order of $\lambda/10$ or even a larger fraction of the antenna operating wavelength, e.g., $\lambda/2$.

Electronics unit 150 comprises a digital transceiver board disposed below ground plane 140. The transceiver board can, for example, be a multilayer laminate board with multiple metallic layers disposed between dielectric layers and interconnected with vias. The digital transceiver board conditions (e.g., filters, amplifies) RF signals transmitted or received by antenna element 120 and the digital distribution network and transforms RF analog signals to high-speed digital signals and reversely. More specifically, as shown in FIG. 2, electronics unit 150 includes a digital communications converter 200 to convert digital signals received from the digital distribution system via digital input/output port 170 to RF analog signals bound for antenna element 120 via RF distribution element 160 and/or to convert RF analog signals in space (SiS) received from antenna element 120 via RF distribution element 160 to digital signals bound for the digital distribution system via digital input/output port 170.

Digital communications converter 200 includes an analog interface 210 that receives RF analog signals from and/or supplies RF analog signals to antenna element 120 via RF distribution element 160. Digital communications converter 200 also includes an analog/digital (A/D) converter (ADC) 220 and a digital interface 230. SiS received at antenna element 120 are conveyed as analog RF signals via RF distribution element 160 and analog interface 210 to A/D converter 220, which converts the analog RF signals into digital signals that are provided to digital interface 230. Digital interface 230 can encode the digital signals to generate the corresponding digital communication signals in a digital communications protocol for transmission on the digital distribution system in a given communication medium (e.g., an optical fiber). For example, the encoding scheme can correspond to any of a variety of digital signal protocols, such as VITA 49.

Similarly, a digital/analog (D/A) converter (DAC) 240 converts digital signals generated by digital interface 230 based on respective digital communication signals received from the digital distribution system to analog RF signals. The analog RF signals can be provided to a power amplifier (PA) 250 that amplifies the analog RF signals and provides the amplified analog RF signals to the antenna element 120 via analog interface 210 and RF distribution element 160 for transmission as SiS from antenna module 100.

Figure 2:
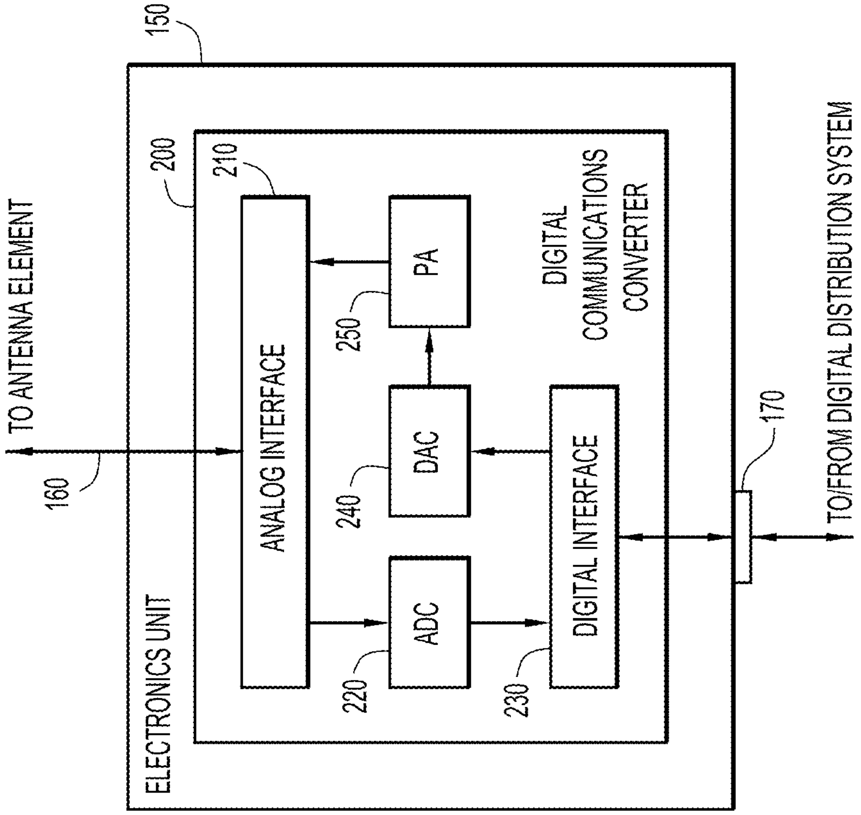
FIG. 2 is a functional block diagram of an electronics unit of an antenna module, including a digital communications converter.

Digital communications converter 200 can include additional RF front-end transceiver circuitry not shown in the example of FIG. 2, such as mixers, filters, amplifiers, low-noise amplifiers, diplexers, switches, local oscillators, high speed direct digital up/down converters (DDC), and optical transceivers converting the high-speed digital signals to optical signal and reversely. Any of a variety of other circuitry configured to process the analog RF signals received at the antenna module 100 and to locally convert the analog RF signals to the corresponding digital communication signals may be included in digital communications converter 200. Likewise, digital communications converter 200 may include any of a variety of other circuitry to process the digital communication signals received via the digital distribution system and digital input/output port 170 for local conversion into corresponding analog RF signals for transmission from antenna element 120 as the SiS. In the case where digital communications converter 200 performs up-conversion and down-conversion between RF and an intermediate frequency (IF) or a baseband frequency, the digital signals supplied to and received from the antenna module 120 can be either digital IF signals or digital baseband signals instead of digital RF signals.

Accordingly, digital communications converter 200 of electronics unit 150 provides for signal conversion between analog and digital signals within the outer housing 110 of antenna module 100 as opposed to typical antenna systems that implement RF cables to interconnect a digital controller system with the antenna elements of an antenna array. By providing the analog-digital conversion within the antenna modules of a distributed directional aperture (DDA) antenna system deployed conformally across the surface of a platform, a backend digital controller system can be coupled to the antenna modules of the antenna array via a digital communication medium, which can be significantly lighter in weight, can introduce significantly less signal losses, and can be significantly more flexible and easier to install than conventional RF cabling, such as coaxial cables. Thus, the size, weight, and power of the overall antenna system can be reduced. Furthermore, certain safety considerations can be alleviated by implementing non-conductive digital cables (e.g., fiber-optic cables) in the associated platform, such as through fuel reservoirs in wings of aircraft, as opposed to conductive RF cables in typical aircraft communications systems.

While the example shown in FIG. 2 shows two-way conversion of digital and analog signals for an antenna element that both transmits and receives SiS, it will be appreciated that an antenna element operating solely as a sensor to receive SiS would require electronics unit 150 its digital communication converter 200 to include only an analog-to-digital (A/D) converter, and that an antenna element operating solely as an emitter to transmit SiS would require electronics unit 150 and its digital communication converter 200 to include only a digital-to-analog (D/A) converter. In general, digital communications converter 200 need not be limited to A/D and/or D/A conversion in the RF frequency range, and optionally can also modulate and/or demodulate in the intermediate (IF) frequency range as well as or in addition to conversion between RF signals.

Figure 3:
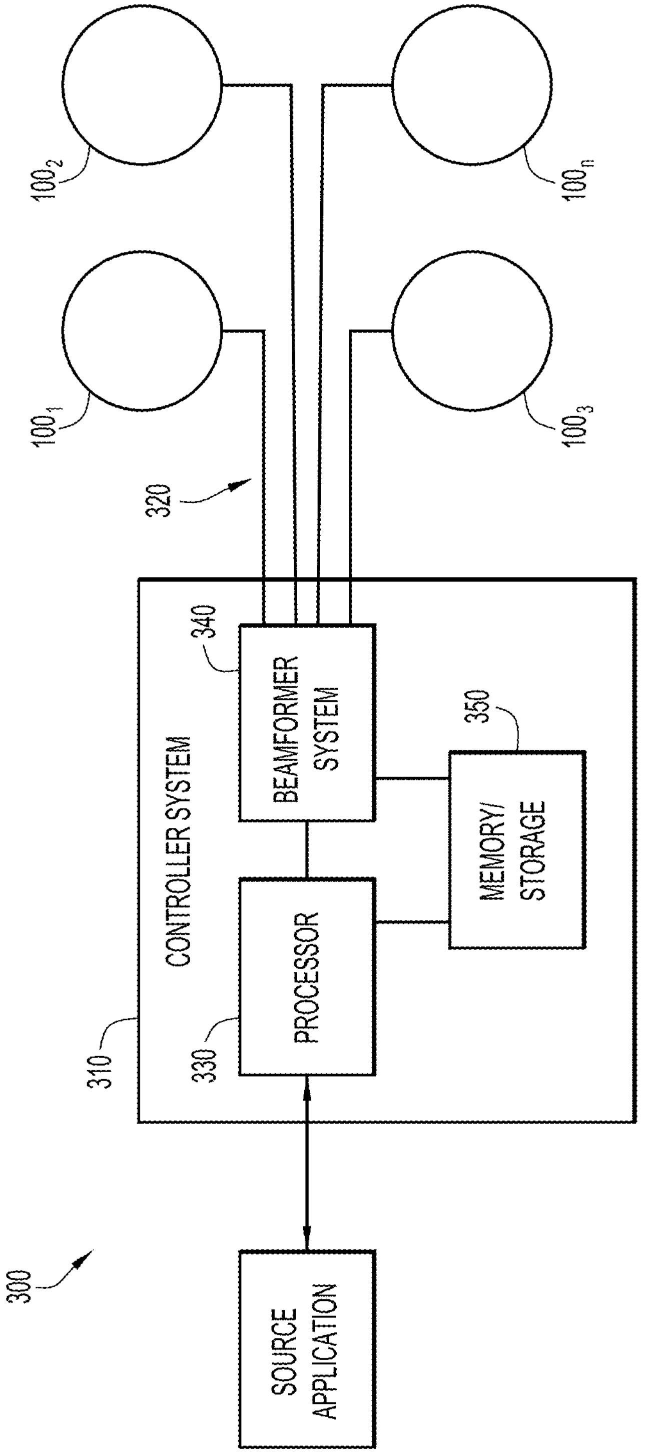
FIG. 3 is a functional block diagram of a phased-array antenna system according to an example implementation.
Figure 4:
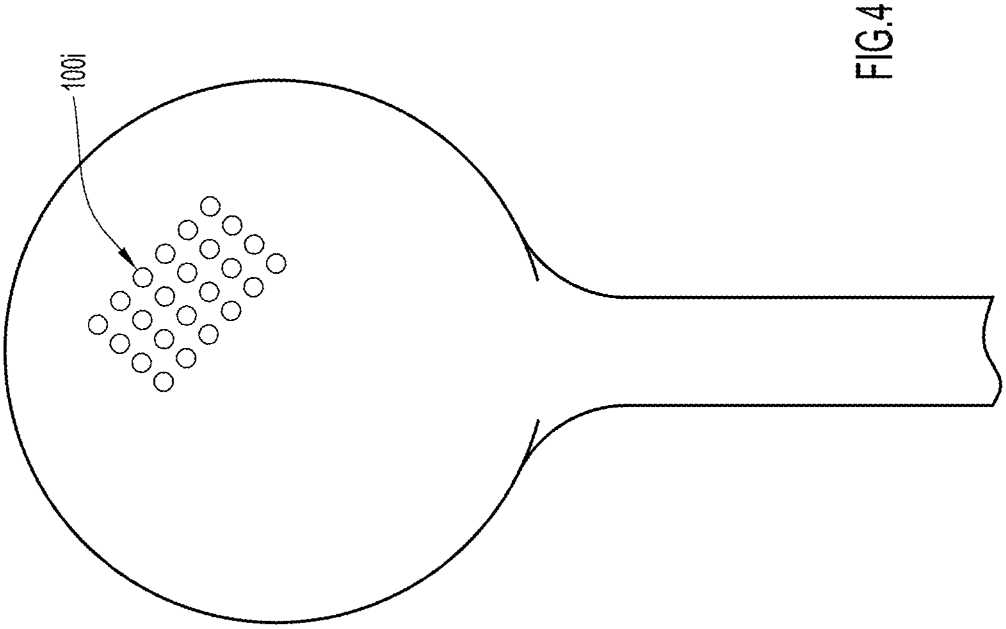
FIG. 4 is a diagram illustrating an example implementation of a distributed direction aperture (DDA) antenna system employing conformal antenna modules mounted on a water tower platform.

FIG. 3 is a block diagram illustrating a phased-array antenna system 300, such as a DDA antenna system, that employs a plurality of conformal antenna modules such as, for example, as described in connection with FIGS. 1A and 1B. Antenna system 300 includes n antenna modules $\mathbf{100}_1$-$\mathbf{100}_n$ coupled to a controller system 310 via a digital distribution system 320. The antenna modules are arranged in an array distributed conformally over the exterior surface of a platform. As previously indicated, depending on the particular application for the antenna system, a wide variety of antenna system platforms may be suitable for installation, including airborne, space, ground, or maritime vehicles or fixed ground or maritime structures. FIG. 4 illustrates an example of an array of antenna elements mounted conformally on the surface of a water tower, which is a suitable installation for a cellular communications base station.

Digital distribution system 320 includes a network of digital connections between the individual antenna modules $\mathbf{100}_i$ and controller system 310. These digital connections comprise a digital communication medium to convey digital signals to and/or from respective input/output ports of the antenna modules at one end and to and/or from controller system 320 at the other end. The digital communication medium can be any of a variety of known media for carrying high-speed digital signals such as optical fiber or lightweight copper connections and replaces an extensive network of heavy and bulky coaxial analog RF cables or the like.

Controller system 310 receives signals to be transmitted by the antenna array from a source application and/or sends signals received by the antenna array to the source application. As previously indicated, the source application can be any of a wide variety of application such as cooperative communications (e.g., cellular communications), uncooperative signal intercept, uncooperative signal interference (e.g., jamming), and distance and/or range rate sensing (e.g., radar). For transmission, controller system 310 is responsible for converting the information/data received from the source application into a waveform suitable for transmission by the antenna array and supplying digital signals to the antenna modules via digital distribution system 320 in a manner that causes the antenna modules of the array to form a directive antenna beam in a specified direction. For reception, controller system 310 is responsible for receiving digital signals from the antenna modules via digital distribution system 320, combining the signals in a manner that corresponds to an antenna beam pattern with a high gain in a specific direction, and converting the received signal waveform to a data format suitable for transmission to the source application.

More specifically, as shown at a conceptual level in FIG. 3, controller system 310 includes a processor 330, a beamformer system 340, and a memory/storage device 350. Processor 330 performs a number of operations to convert input information/data signals into a transmission waveform suitable for distributing to antenna modules $\mathbf{100}_i$ via beamformer system 340 and digital distribution system 320 and vice-versa and can be implemented in hardware, software, or a combination of hardware and software, as appropriate. For example, processor 330 and beamformer system 340 can include one or more microprocessors, microcontrollers, or digital signal processors capable of executing program instructions (i.e., software) for carrying out at least some of the various operations and tasks to be performed by controller system 310. Controller system 310 further includes one or more memory or storage devices 350 to store a variety of data and software instructions (control logic) for execution by processor 330 and beamformer system 340. The memory may comprise read only memory (ROM), random access memory (RAM), magnetic disk storage media devices, optical storage media devices, solid-state memory devices, flash memory devices, electrical, optical, or other physical/tangible (e.g., non-transitory) memory storage devices. Thus, in general, memory/storage device 350 comprises one or more tangible (non-transitory) processor-readable or computer-readable storage media that stores or is encoded with instructions (e.g., control logic/software) that, when executed by processor 330 and/or beamformer system 340 of controller system 310, cause processor 330 and/or beamformer system 340 to perform the operations described hereinbelow. One or more of the components of controller system 310 can also be implemented in hardware as a fixed data or signal processing element, such as an application specific integrated circuit (ASIC) that is configured, through fixed hardware logic, to perform certain functions. Yet another possible processing environment is one involving one or more field programmable logic devices (e.g., FPGAs), or a combination of fixed processing elements and programmable logic devices. According to another option, processor 330 can be implemented primarily or entirely with multi-core general purpose processors, providing a digital, substantially off-the-shelf implementation.

Depending on the source application, processor 330 can implement a waveform system for communications, electronic intercept, electronic interference, and sensing. The waveform system may be generalized to host any of those services in a common hardware suite. For example, the waveform system of processor 330 may accept messages or packets for transmission from the source application and generate a suitable digital transmission waveform containing the information or data in the messages or packets for distribution to antenna modules $100_i$ via beamformer system 340 and digital distribution system 320. Likewise, the waveform system of processor 330 may receive digital signals from beamformer system 340 that represent signals received from antenna modules $100_i$ and perform signal detection and conversion to a digital signal format suitable for sending to the source application in the form of messages or data packets, for example. Processor 330 may also provide capabilities such as encryption, decryption, and digital packet routing in conjunction with the waveform system.

In the case where the digital communication converter 200 of each antenna module $100_i$ provides up-conversion from baseband or IF to RF, the waveform signals generated by processor 330 and supplied to beamformer system 340 can be either digital baseband or digital IF transmission signals as the case may be. Otherwise, the generated waveform is up-converted to a digital RF signal by processor 330 before being sent to antenna modules $100_i$ by digital distribution system. Likewise, on reception, if the digital communication converter 200 of each antenna module $100_i$ provides down-conversion from RF to IF or baseband, processor 330 either performs IF-to-baseband conversion or no frequency conversion as the case may be. Otherwise, processor 330 down-converts the combined digital RF signal stream to baseband for detection and processing.

Beamformer system 340 includes the processing capability to control the relative phases of the digital signals supplied to and/or received from individual antenna modules $100_i$ in the array to enable the antenna elements 120 to form a directive, steerable antenna beam pattern based on well-known principles of constructive and destructive interference among the omnidirectional beam patterns of the individual antenna elements arranged in an array. For transmission, beamformer system 340 receives a digital transmission waveform from processor 330 and generates individual digital transmission waveform signals for each of antenna modules $100_i$, whose relative phases are selected such that the gain of the beam emitted from the array is focused in a specific direction, i.e., a directional transmit beam, by creating and temporally aligning the emitted data stream for each antenna module $100_i$. Beamformer system 340 computes the digital signals for each antenna module $100_i$ in order to transmit energy in a specific direction and power level, potentially aggregating signals when antenna modules $100_i$ are used to generate multiple beams simultaneously.

The spacings, relative location, and orientation of the individual antenna modules $100_i$ can be factored into the beamformer system's computations of the relative phases (temporal alignment values) of the signals supplied to antenna modules $100_i$ of the array in order to produce the desired beam pattern. For example, particularly where the platform is not stationary, the generated signals may be based upon the position and attitude of the platform, computed using externally-supplied platform position and orientation data.

For reception, beamformer system 340 coherently combines and sums the digital signals received through digital distribution system 320 from individual antenna modules $100_i$ to form a reception beam that is focused in a specific direction, i.e., a directional receive beam, by temporally aligning the data and then summing the individual time domain samples. Here again, the temporal alignment may be based upon the position and attitude of the platform, computed using externally-supplied platform data. Beamformer system 340 routes the resultant stream of directionally received digital signals to the waveform system of processor 330 for detection and conversion to application data/packets.

The characteristics of the antenna beam pattern produced by the antenna system will be a function of the number of antenna elements and the total span of the antenna elements across the platform's exterior surface. For example, a span of 48λ can be provided, where λ is the free-space wavelength of the lowest operating frequency of interest. By way of a non-limiting example, the spacing between adjacent antenna elements can be λ/2. In a test implementation, a phased-array antenna system employing 20 conformal antenna elements spaced at 15 inches achieved a 5.5° beam width with 26 dB array gain and 13 dB sidelobe suppression at an operating frequency of 400 MHz. These examples are merely for illustrative purposes, and actual implementations may deviate from these general guidelines without compromising the overall design integrity.

The antenna module installation location on the platform may be optimized to provide the desired field of view while not compromising entity characteristics, such as structural efficiency. Stable surfaces, horizontal faces, and edges may be preferred installation locations in many embodiments.

Cellular communication is one potential application for the described DDA antenna system. In this context, the antenna system may provide cellular communication beams with beam widths of approximately 3°-5°, or in some instances, less than 3°. The small beam width may provide a cellular communication base station with a 5,000% increase in cellular channel reuse, since beams may be generated in multiple azimuth directions and elevations without overlap, providing geographic spectral reuse across beams with negligible impact on the overall waveform efficiency.

The relatively small beam width may provide significantly more accurate location crossfix determinations, e.g., cell tower triangulation of a mobile device. Since the beam width may be 3°-5° compared to the conventional azimuth beam width of 120°, the beam arc at a determined distance may be substantially smaller. As such, the overlap with other cell tower beam arcs may be substantially reduced.

The relatively narrow transmit beam, by comparison to conventional cellular base station towers, may allow the cellular base station tower equipped with a DDA antenna system to transmit dozens of beams in multiple azimuth directions. Using beams with a beam width of less than or about 5° as an example, the DDA antenna system may be able to transmit up to 72 separate transmit beams without overlap, or 120 beams using a beam width of no more than 3°, resulting in an increase in spectrum reuse of over 50 times. Further spectrum reuse may be achieved in the elevation dimension.

An additional benefit of the directional receive and transmit beams in the cellular context is that neighboring cellular base stations may use more or, in some cases, the entire cellular communication spectrum by coordinating with adjacent cellular base stations, e.g., through the cellular network to limit interference (i.e., crossing beams). In some examples, a first cellular base station may limit use of specified channels in only the direction of a second cellular base station tower. In other example embodiments, the coordination may be specific to the individual beam directions, e.g., azimuth and elevation, preventing receive and transmit beams that would cross at a point in their range of propagation. With the foregoing in mind, the number of cellular users per channel may be expanded, similar to conventional cellular base station towers, by encoding the cellular signal based on a subscriber identity, such as an international mobile subscriber identity. The cellular base station may encode the subscriber data, to allow multiple users to utilize the same cellular spectrum channel of the same antenna system.

FIG. 4 is a view of a water tower serving as a platform for an example phased-array antenna system employing an array of conformal antenna modules 100$_i$ distributed over external surface of the water tower and including a supporting digital distribution system and controller system, such as those shown in FIG. 3, which are situated within the water tower, for example. More generally, the choice of installation platforms and locations for the antenna system can be based upon the skin materials, and structural of the platform. Metallic skins may be opaque to most energy signals, so the antenna elements may be installed on the exterior of a metallic skin. Optionally, the antenna modules may be suitable for lying flat on the skin of the platform and held in place by adhesive or environmentally-suitable tape as previously described.

According to one option, an array of antenna modules may be pre-placed onto a strip of tape which is then applied to the surface of a platform. According to another option, the antenna modules may be embedded within the interior of a composite material skin as part of the skin fabrication process. According to yet another option, the antenna elements of the antenna modules may be formed on flexprint in order to conform to the shape of the exterior surface of the platform. Many other installation options will be understood by a person skilled in the art of aperture design and installation and all such embodiments are envisioned by this design. It would also be understood by one of ordinary skill in the art that the installation embodiments may be utilized individually or in any combination.

Having described example embodiments of a digital conformal antenna, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A phased-array antenna system comprising:
- a plurality of discrete antenna modules arranged in an array and configured to be disposed conformally with a surface of a platform, each antenna module comprising:
  - an antenna element to emit and/or absorb radio frequency (RF) signals;
  - a digital input/output port to send and/or receive digital signals;
  - an electronics unit including at least one of an analog-to-digital (A/D) converter and a digital-to-analog (D/A) converter to provide an interface between the antenna element and the digital input/output port; and
  - a housing in which the antenna element and electronics unit are integrally packaged, wherein the housing is a low-profile housing having a maximum height dimension less than λ/10, where λ is the wavelength at a lowest operating frequency of the antenna element;
- a digital distribution system comprising a digital communications medium to convey digital signals to and/or from respective digital input/output ports of the antenna modules; and
- a controller system to supply the digital signals to the antenna modules and/or to receive digital signals from the antenna modules via the digital distribution system, wherein the controller system controls relative phases of the digital signals to enable the antenna elements to form a directive antenna beam pattern.

2. The phased-array antenna system of claim 1, wherein each antenna module further comprises:
- a ground plane disposed between the antenna element and the electronics unit; and
- a substrate disposed between the antenna element and the ground plane, the substrate comprising a lossy ferrite material.

3. The phased-array antenna system of claim 1, wherein each antenna module further comprises:
- a ground plane disposed between the antenna element and the electronics unit; and
- a substrate disposed between the antenna element and the ground plane, the substrate comprising a tuning resonant disk.

4. The phased-array antenna system of claim 1, wherein each antenna module further comprises:
- a ground plane disposed between the antenna element and the electronics unit; and
- a substrate disposed between the antenna element and the ground plane, wherein the antenna element, the substrate, the ground plane, and the electronics unit are arranged in a stack within the housing of the antenna element.

5. The phased-array antenna system of claim 1, wherein the electronics unit comprises a digital communications converter comprising:
- the A/D converter and D/A converter;
- an analog interface to supply analog RF signals from the antenna element to the A/D converter and to receive analog RF signals from the D/A converter;
- a digital interface to receive digital signals from the A/D converter and to supply digital signals to the D/A converter, the digital interface being coupled to the digital input/output port.

6. The phased-array antenna system of claim 5, wherein the digital communications converter up-converts baseband or intermediate frequency (IF) digital signals received from the digital distribution medium to RF signals.

7. The phased-array antenna system of claim 5, wherein the digital communications converter down-converters RF signals received from the antenna element to digital baseband or intermediate frequency (IF) signals.

8. The phased-array antenna system of claim 1, wherein each of the antenna modules operates in at least two frequency bands.

9. The phased-array antenna system of claim 1, wherein the controller system supplies and receives cellular communications signals.

10. The phased-array antenna system of claim 1, wherein the controller system comprises a digital beamformer system.

11. The phased-array antenna system of claim 1, wherein the digital communications medium comprises optical fiber.

12. An antenna module comprising:
- an antenna element to emit and/or absorb radio frequency (RF) signals;

a digital input/output port to send digital signals to and/or to receive digital signals from a digital communications medium;

an electronics unit including at least one of an analog-to-digital (A/D) converter and a digital-to-analog (D/A) converter to provide an interface between the antenna element and the digital input/output port; and a housing shaped to be disposed conformally with an exterior surface of a platform, wherein the antenna element and electronics unit are disposed within the housing, and the digital input/output port provides ingress/egress of the digital signals to/from the housing, wherein the each antenna module further comprises:

a ground plane disposed between the antenna element and the electronics unit; and a substrate disposed between the antenna element and the ground plane, the substrate comprising a tuning resonant disk.

13. The antenna module of claim 12, wherein the antenna module further comprises:

a ground plane disposed between the antenna element and the electronics unit; and a substrate disposed between the antenna element and the ground plane, the substrate comprising a lossy ferrite material.

14. The antenna module of claim 12, wherein each antenna module further comprises:

a ground plane disposed between the antenna element and the electronics unit; and a substrate disposed between the antenna element and the ground plane, wherein the antenna element, the substrate, the ground plane, and the electronics unit are arranged in a stack within the housing of the antenna element.

15. The antenna module of claim 12, wherein each of the antenna modules operates in at least two cellular frequency bands.

16. A phased-array antenna system comprising:

a plurality of discrete antenna modules arranged in an array and configured to be disposed conformally with a surface of a platform, each antenna module comprising:

an antenna element to emit and/or absorb radio frequency (RF) signals;

a digital input/output port to send and/or receive digital signals;

an electronics unit including at least one of an analog-to-digital (A/D) converter and a digital-to-analog (D/A) converter to provide an interface between the antenna element and the digital input/output port; and a housing in which the antenna element and electronics unit are integrally packaged;

a digital distribution system comprising a digital communications medium to convey digital signals to and/or from respective digital input/output ports of the antenna modules; and a controller system to supply the digital signals to the antenna modules and/or to receive digital signals from the antenna modules via the digital distribution system, wherein the controller system controls relative phases of the digital signals to enable the antenna elements to form a directive antenna beam pattern, wherein the electronics unit comprises a digital communications converter comprising:

the A/D converter and D/A converter;

an analog interface to supply analog RF signals from the antenna element to the A/D converter and to receive analog RF signals from the D/A converter;

a digital interface to receive digital signals from the A/D converter and to supply digital signals to the D/A converter, the digital interface being coupled to the digital input/output port.

17. The antenna module of claim 16, wherein the digital communications converter up-converts baseband or intermediate frequency (IF) digital signals received from the digital distribution medium to RF signals.

18. The antenna module of claim 16, wherein the digital communications converter down-converters RF signals received from the antenna element to digital baseband or intermediate frequency (IF) signals.

19. A phased-array antenna system comprising:

a plurality of discrete antenna modules arranged in an array and configured to be disposed conformally with a surface of a platform, each antenna module comprising:

an antenna element to emit and/or absorb radio frequency (RF) signals;

a digital input/output port to send and/or receive digital signals;

an electronics unit including at least one of an analog-to-digital (A/D) converter and a digital-to-analog (D/A) converter to provide an interface between the antenna element and the digital input/output port;

a housing in which the antenna element and electronics unit are integrally packaged;

a ground plane disposed between the antenna element and the electronics unit; and a substrate disposed between the antenna element and the ground plane, the substrate comprising a tuning resonant disk;

a digital distribution system comprising a digital communications medium to convey digital signals to and/or from respective digital input/output ports of the antenna modules; and a controller system to supply the digital signals to the antenna modules and/or to receive digital signals from the antenna modules via the digital distribution system, wherein the controller system controls relative phases of the digital signals to enable the antenna elements to form a directive antenna beam pattern.

* * * * *